Sept. 14, 1926.　　　M. B. REED　　　1,600,201
GLARESHIELD FOR AUTOMOBILES
Filed Dec. 23, 1925
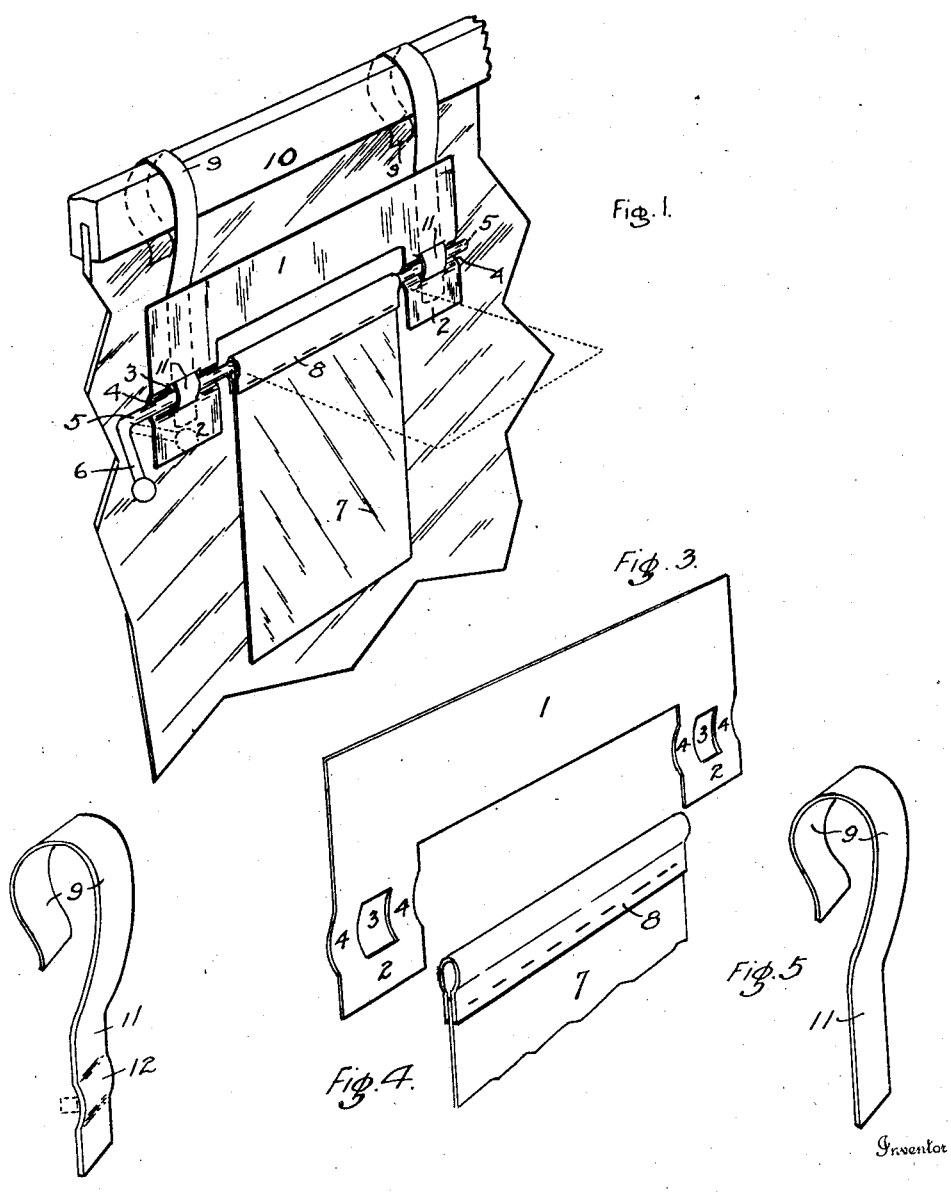
Inventor
Melvin B. Reed Patented Sept. 14, 1926.

1,600,201

UNITED STATES PATENT OFFICE.

MELVIN B. REED, OF TACOMA, WASHINGTON.

GLARESHIELD FOR AUTOMOBILES.

Application filed December 23, 1925. Serial No. 77,213.

This invention relates to devices adapted to be attached to the wind shield of an automobile for the purpose of shielding the eyes of the driver from the glare of the headlights of approaching machines, and has for its objects to provide such a device which may be readily attached to or removed from the wind shield and may be shifted laterally to any desired transverse position thereon; which, when so fastened, may be tipped into or away from such shielding position, as desired; and which is cheap and simple to make, easy to apply, and effective in use.

A further object is to provide a novel means of attaching the various separate members of the device together, thereby materially reducing its cost of manufacture and permitting it to be shipped disassembled thus economizing on the cost of delivery in large quantities.

I attain these and other objects by the devices and arrangements illustrated in the accompanying drawings, in which Fig. 1 is a perspective view of my device in use showing also, in dotted lines, the position of the shield when turned into inoperative position; Fig. 2 is a similar view of one of the spring strips; Fig. 3 is a similar view of the frame plate; Fig. 4 is a similar view of the shield clip; and Fig. 5 is a similar view of a slightly different form of spring strip. Similar numerals of reference refer to similar parts throughout the several views.

It is a matter of common experience that, when driving an automobile after dark, the driver is seriously handicapped by the blinding brightness of the lights of an approaching car, and also he may be similarly affected by the direct or reflected rays of the sun when driving during the day. To meet this condition it has been common to mount a piece of transparent but ray-selective, material on the wind shield of the automobile, in direct line with the normal vision of the driver, whereby the glare of such light is destroyed without materially reducing the visibility of other objects therethrough. However, it is also desirable to mount said ray filter in such manner that it may be easily and quickly removed from this line of normal vision, when it is not needed, by simply turning it on a pivot. But such devices as have been produced are made in a very impractical and expensive manner, thus bringing the cost thereof beyond the desirable limits for a device of this character, and further, these devices are mounted or constructed in such a way as to quickly develop loose joints either in themselves or between them and the wind shield, thereby causing a very annoying and distracting rattle when the car is in motion.

Referring to the drawings it will be seen that my device is extremely simple in form and construction, most of which may be stamped from sheet metal, and comprises very few parts, and that these parts are easily assembled without having to use any tools. The main vertical frame plate 1 is provided with two depending ears 2 at its ends, said ears forming a wide notch between them wherein the ray shield is mounted. Each said ear 2 is provided with a slot 3 and is depressed on each side of the said slot to form a groove 4. The axis of these two grooves 4 lies horizontally across the two slots 3, near their vertical centers.

A horizontal rod 5 lies in said grooves 4 and extends across the entire face of the device and may be provided with an operating handle 6 at one or both ends. This rod 5 may be flattened along its entire length, or only at the parts adjacent to the slots 3 though this flattening is not a necessary part thereof.

A ray filter sheet 7 is permanently fastened between the edges of a clip 8 which is, in turn, fixedly secured on to the rod 5, in any suitable manner, in that part lying between the two ears 2 of the frame plate 1.

A spring steel strip is formed with a general hook shape 9 at its upper end, adapted to grip over the top of the wind shield 10 and to press the two sides thereof by means of its spring action. The lower end 11 of this strip may either be straight, as in Fig. 5, or be provided with a slight transverse groove 12, as in Fig. 2. One of these strips is provided for each end of the glare shield and is mounted therein, when the device is being assembled, as hereinafter described. When this device is used on closed cars then the strips will be of a slightly different shape than shown, being provided without any hook portion 9 and being perforated so as to be secured to the upper frame of the front window, or wind shield, of the car by means of screws, or other suitable means.

The device is assembled in the following manner:—The rod 5, with the shield 7 and clip 8 secured in place thereon, is first laid in the grooves 4 in the ears 2 of the plate 1;

then the spring steel strips are in turn inserted by first passing the end 11 thereof on the under side of the plate 1, opposite to that on which the rod 5 lies, down into the slot 3, over the rod 5, across the groove 4, and then out of the said slot 3 to the same side of the said plate 1. The device is now assembled and is ready to be mounted on a car for use.

When the strip 11 is flat, as in Fig. 5, the grooves 4 in the ears 2 must be slightly deeper than when the said strip 11 is itself provided with a complementary groove 12. In either case the parts are so made and proportioned as to firmly clasp the rod 5 between the strip 11 and the parts of the ears 2 forming the said groove 4. When the parts are thus assembled, it will be seen that the springs 11 clamp the rod 5 to the frame and also keep it from turning freely in the bearing formed thereby, and yet permit it to be turned therein when desired. The device may then be mounted on the wind shield 10 by slipping the hooks 9 thereover, thus clamping the plate 1 tightly to the wind shield, preventing its rattling thereon, as well as supporting the entire device from the top edge of the said wind shield.

It will therefore be seen that the spring strips perform several desirable functions without detracting from, but rather increasing, the simplicity of the device. First, they secure the rod and shield to the frame; second, they hold the rod from rotating when it is not desired to rotate it; third, they support the frame from the wind shield; fourth, they clamp the entire device on the wind shield and prevent it from rattling thereon; and fifth, they clamp all parts together and prevent any rattling therebetween.

It is evident that when the portion of the rod 5, under the said spring strips 11, is flattened, as above mentioned, that it will aid the said spring 11 in keeping the rod 5 from turning in the bearing formed thereby, especially if said flattened part is in contact with said spring when said screen 7 is in its withdrawn, or horizontal position.

Having described my invention, what I claim is:—

1. An automobile glare shield comprising a vertical frame plate having slots in its ends; a horizontal rod extending along the frame, on one side thereof, and across both said slots; a ray-filter shield secured on said rod between the slots; and two spring strips, each extending downward across one said slot and engaging the side of the frame opposite to that on which the rod lies, above and below the rod, said frame and strip interweaving with each other at the slot and coacting to enclose the rod to form a tight bearing therefor, whereby the rod is held in the frame and is rotatable therein to turn said shield into or out of operating position.

2. An automobile glare shield comprising a vertical frame plate having slots in its ends; a horizontal rod extending along the frame, on one side thereof, and across both said slots; a ray-filter shield secured on said rod between the slots; and two spring strips, each formed to provide a spring hook whereby the device is supported on the wind shield of an automobile and is clamped thereto, and each extending downward across one said slot and engaging the side of the frame opposite to that on which the rod lies, above and below the rod, said frame and strip interweaving with each other at the slot and coacting to enclose the rod to form a tight bearing therefor, whereby the rod is held in the frame and is rotatable therein to turn said shield into or out of operating position, and whereby the frame, rod, and shield are attached to said clamping hooks.

MELVIN B. REED.